US012722858B2

(12) United States Patent
Santos Leite

(10) Patent No.: US 12,722,858 B2
(45) Date of Patent: Sep. 1, 2026

(54) OPENING DEVICE FOR ASEPTIC CARTON PACKAGING USED FOR ENTERAL NUTRITION THROUGH CLOSED SYSTEM OR OPEN SYSTEM

(71) Applicant: Ronaldo Santos Leite, Paulínia/SP (BR)

(72) Inventor: Ronaldo Santos Leite, Paulínia/SP (BR)

(73) Assignee: NEOLEVER LTDA, Campinas (BR)

( * ) Notice: Subject to any disclaimer, the term of this patent is extended or adjusted under 35 U.S.C. 154(b) by 0 days.

(21) Appl. No.: 18/665,060

(22) Filed: May 15, 2024

(65) Prior Publication Data

US 2025/0011053 A1 Jan. 9, 2025

Related U.S. Application Data

(63) Continuation of application No. PCT/BR2022/050435, filed on Nov. 11, 2022.

(30) Foreign Application Priority Data

Nov. 15, 2021 (BR) .......................... 1020210229241

(51) Int. Cl.
*B65D 47/38* (2006.01)
*A61J 1/14* (2023.01)
(Continued)

(52) U.S. Cl.
CPC ............ *B65D 47/38* (2013.01); *A61J 1/1418* (2015.05); *A61J 15/0026* (2013.01); *B65D 5/747* (2013.01)

(58) Field of Classification Search
CPC ........ B65D 47/38; B65D 5/747; B65D 5/748; B65D 5/74; B65D 41/20; B65D 41/50;
(Continued)

(56) References Cited

U.S. PATENT DOCUMENTS

| | | | | |
|---|---|---|---|---|
| 3,904,060 | A | 9/1975 | McPhee | |
| 4,826,500 | A * | 5/1989 | Rautsola | A61J 1/1406 222/91 |

(Continued)

FOREIGN PATENT DOCUMENTS

| | | | |
|---|---|---|---|
| CN | 1711116 | A | 12/2005 |
| CN | 202244558 | U | 5/2012 |

(Continued)

OTHER PUBLICATIONS

International Search Report for International Patent Application No. PCT/BR2022/050435 (Feb. 17, 2023).

*Primary Examiner* — Shawn M Braden
(74) *Attorney, Agent, or Firm* — Merchant & Gould P.C.

(57) ABSTRACT

The present invention falls within the technical field of Food Packaging and was developed specifically to meet the needs of the Enteral Nutrition market. This innovation proposes a unique packaging solution, compatible with both Closed Enteral Systems and Open Enteral Systems. It is defined as an integrated opening device in the aseptic carton packaging, which allows direct connection to the enteral feeding set without the need for external devices (such as adapters and connectors). Thus, the invention transforms the conventional use of aseptic carton packaging—previously limited to open enteral systems—into a versatile, multi-use solution. Featuring characteristics equivalent to those of specialized packages for closed systems available in the market, this device, when incorporated into aseptic carton packaging, enables the contained product to be administered in both closed and open enteral systems. This is made possible by its features that allow direct connection to the enteral feeding set while provide the essential functionalities of traditional aseptic carton packaging, such as the rupture of the internal protective seal, which occurs when unscrewing the cap.

10 Claims, 6 Drawing Sheets

(51) Int. Cl.
*A61J 15/00* (2006.01)
*B65D 5/74* (2006.01)

(58) Field of Classification Search
CPC ........ B65D 43/00; B65D 47/32; B65D 51/22; A61J 1/1418; A61J 15/0026; A61J 1/14; A61J 15/00; A61J 1/05; A61M 39/00
See application file for complete search history.

(56) References Cited

U.S. PATENT DOCUMENTS

| | | | | |
|---|---|---|---|---|
| D330,332 | S | 10/1992 | Pezzoli et al. | |
| 5,960,992 | A * | 10/1999 | Bernstein | B67B 7/26 222/88 |
| D427,306 | S | 6/2000 | McCallister et al. | |
| 6,279,779 | B1 * | 8/2001 | Laciacera | B65D 5/748 222/541.2 |
| 6,820,764 | B2 * | 11/2004 | Miani | B65D 5/748 222/91 |
| 7,484,641 | B2 * | 2/2009 | Casale | B65D 5/748 222/83.5 |
| 7,757,892 | B2 | 7/2010 | Berman | |
| 7,841,484 | B2 | 11/2010 | Kaneko et al. | |
| 8,372,328 | B2 * | 2/2013 | Dubach | B29C 45/006 220/264 |
| 2018/0296438 | A1 | 10/2018 | Brandenburger et al. | |

FOREIGN PATENT DOCUMENTS

| | | | |
|---|---|---|---|
| DE | 3906418 | A1 | 9/1990 |
| EP | 1088765 | A1 | 4/2001 |
| EP | 1352843 | A1 | 10/2003 |
| EP | 2055640 | A1 | 5/2009 |
| EP | 3048064 | A1 | 7/2016 |
| WO | 95/05996 | A1 | 3/1995 |
| WO | 2006/020635 | A2 | 2/2006 |
| WO | 2007/115978 | A1 | 10/2007 |
| WO | 2010/030528 | A2 | 3/2010 |
| WO | 2019/193213 | A1 | 10/2019 |

* cited by examiner

OPENING DEVICE FOR ASEPTIC CARTON PACKAGING USED FOR ENTERAL NUTRITION THROUGH CLOSED SYSTEM OR OPEN SYSTEM

This application is a Continuation of International Patent Application No. PCT/BR2022/050435, filed on Nov. 11, 2022, which claims benefit of priority to Patent Application No. 1020210229241, filed on Nov. 15, 2021 in Brazil, and which applications are incorporated herein by reference. To the extent appropriate, a claim of priority is made to each of the above disclosed applications.

FIELD OF THE INVENTION

The present invention pertains to the field of opening devices for aseptic carton packaging. Defined as an opening device, it consists of a lower part (base) and an upper part (cap) provided with an insert for connecting enteral feeding sets. Being inseparably integrated with the referred packaging during the manufacturing stage, this opening device determines the functions of the packaging and the ways of using the content stored in it. By replacing the traditionally used opening devices in aseptic carton packaging, the present invention makes it possible to administer these products in closed enteral systems; however, it optionally provides mechanisms for their use in an open enteral system. Thus, this device, in addition to serving the traditional applications in open systems, enables the use of aseptic carton packaging in enteral products ready to be administered in closed systems.

BACKGROUND OF THE INVENTION

Nutritional therapy (NT), an essential strategy in patient care for both humans and animals, can be implemented in three modalities: oral, enteral, and parenteral. Parenteral nutritional therapy (PNT), which is not relevant to the state of the art for this invention, involves the intravenous administration of nutrients. It is recommended for patients whose digestive tract is entirely compromised or as a supplement for those unable to meet their nutritional needs exclusively through the digestive system. On the other hand, oral feeding, also unrelated to the state of the art of the present invention, is the preferred option for patients with a functionally intact digestive system, allowing normal ingestion of food orally.

Enteral nutritional therapy (ENT), for which this invention was developed, is a method of providing nutrients through the gastrointestinal tract (GIT). It is typically used when the patient has a functional GIT but cannot consume food orally to meet their nutritional needs.

ENT is indicated for cases where oral intake of food is insufficient or impossible, but the gastrointestinal tract is fully or partially functional. This may occur for patients with neurological damage, such as a stroke, patients with swallowing difficulties, or those in a reduced state of consciousness due to surgeries or other health complications.

Enteral nutrition offers several advantages over parenteral nutrition, such as using the gastrointestinal tract, which helps maintain intestinal barrier function and supports the gut microbiome, among other benefits.

About Enteral Nutrition Administration Systems

Enteral nutrition is a process that involves the use of an administration system, consisting of an enteral feeding tube and a device known as an enteral feeding set, which connects the tube to the nutritional product.

In enteral administration, the feeding tube and feeding set play fundamental roles. The enteral feeding set, which is the primary device relevant to the present invention, comprises a flexible tube with a sharp element at the proximal end designed to penetrate a specific region of the container holding the enteral food, along with other elements that work synergistically to form a secure connection with the container.

The part of the enteral system formed by the feeding set connected to the enteral feeding tube provides an efficient and secure channel for administering the food, allowing the enteral formula to be delivered directly to the clinically appropriate portion of the patient's digestive system, whether in the stomach or intestine. This procedure ensures that the patient's nutritional needs are met, even when health conditions prevent conventional oral feeding.

Regarding enteral feeding administration techniques, two systems are used, each with unique characteristics directly related to maintaining product sterility and offering different levels of safety during handling, preparation, and administration to the patient: the open system and the closed system. It is important to note that the specifics of the administration technique through the closed system are closely related to the distinguishing feature of the present invention.

About Enteral Nutrition Administered Via an Open System:

The most common method for administering enteral nutrition using an open system involves the use of disposable plastic bottles specifically developed for this purpose. These bottles are equipped with caps designed to connect to enteral sets intended for the administration of enteral nutrition, enabling the direct delivery of the product to the patient through a feeding tube.

In the open system, the industrially produced enteral nutrition formula is transferred from its original packaging, an aseptic carton packaging, into the enteral feeding bottle or bag. This transfer can be done manually or with the aid of devices that facilitate the process. It's important to note that aseptic carton packaging used in open-system products typically features automated opening devices (AODs).

However, when the formula is transferred from the aseptic carton packaging to the enteral feeding container, it becomes exposed to the environment and loses its sterility. For this reason, the open system has a shorter administration timeframe after preparation—typically 4 to 8 hours from opening to the end of infusion—and requires careful handling to ensure patient safety. This is a significant disadvantage compared to the closed system, which has an administration timeframe of 24 to 48 hours. It's mandatory that the handling of the enteral nutrition formula in the open system be performed in a hygienically controlled and validated environment.

The integrated opening system commonly used in aseptic carton packaging generally consists of an automated opening device—composed of a base with a spout and a cap—affixed to a pre-cut and weakened section of the packaging. Such automated opening devices are incorporated into aseptic carton packaging by an automated machine. This machine applies a layer of hot-melt adhesive to the underside of the base of the opening device, then positions it over the weakened section of the packaging, firmly pressing it down. The hot-melt adhesive cools rapidly, integrating the opening device to the packaging and completing the process.

It is important to note that such applicator machines are highly efficient and accurate, capable of processing a large volume of packaging per minute in a controlled environment. Furthermore, these machines are pre-set to apply a device of a particular size and shape. Therefore, it is crucial that the opening device is made from a material robust enough to withstand the machine's forces during processing and is precisely dimensioned to match the applicator machine's pre-established parameters. It's worth noting that this invention was developed to work seamlessly with these machines without requiring any adjustments to the pre-set parameters for the standard opening device.

The importance of barrier layers in food packaging is widely recognized, essential for protecting them against the detrimental effects of oxygen and light. Aseptic carton packaging is a notable example of this type of packaging. Long before its application in enteral formulas, this packaging was already used to aseptically contain liquid products.

Such multilayer packaging typically features a thicker layer of fibrous material that is coated on both sides by layers of a sealing material, usually made of low-density polyethylene (LDPE). Thus, during the packaging formation, both surfaces (external and internal) are covered by layers of this sealing material. The thicker fibrous material, usually made of cardboard, provides structural stability to the packaging. For this reason, these packages are commonly known as aseptic carton packaging.

Over the years, these packages have undergone evolutions, especially in their opening systems. Such systems are widely recognized and used across a broad range of products, from items like milk and juices to enteral nutrition (open system). Some of these mechanisms include: a) packaging without an integrated opening system (WIOS); b) "Single Serving" opening system (SSOS); c) "Pull Tab" opening system (PTOS); d) "ReCap" type cap (RCTL); e) cap with manual seal opening (LMSO); f) automated opening device (AOD). The latter, the automated opening device (AOD), will be particularly detailed. This is due to the fact that the process of applying the AOD is identical to the process of applying the device conceived by the present invention, developed to be applied as a replacement for the AOD when the manufactured product is intended for a closed system, justifying its importance to this document.

The automated opening device (AOD) is commonly integrated into the top of aseptic multilayer packaging, consisting of a base with a threaded spout and a corresponding cap. This configuration allows the packaging to be resealed and stored for future use after it has been opened and partially used.

The laminated material intended for this type of opening has the top layers of plastic and cardboard strategically removed in the region just below where the AOD will be affixed. The resulting region is a weakened area, a circular cut concentric to the spout of the AOD's base, which acts as a protective seal for the contents. It is precisely this weakened layer that will be cut during the first opening of the cap.

Within the AOD, positioned inside the base's spout in a cooperative manner relative to the cap, there is a cutting element, typically cylindrical in shape with a serrated lower end, which is activated upon the first rotation of the cap, cutting through the weakened region of the packaging and opening it. When unscrewed in the opening direction, the cap performs an upward axial rotational movement over the spout. Simultaneously with this movement, the cutting element performs a downward movement to cut the weakened layer of the packaging. Some types of automatic opening devices for aseptic carton packaging as mentioned above are described in patent documents WO95/05996, U.S. Pat. Nos. 6,279,779, 6,820,764, 7,484,641, 7,757,892, 7,841,484, 8,372,328, and WO2007/115978. In all of them, when unscrewed for the first time, the cap activates the cutting element to cut the weakened layer, opening the packaging to access its content.

It is widely known that enteral nutrition products intended for open systems use aseptic carton packaging. Thus, the techniques related to the open system present a mode of administration that requires opening the packages and transferring the product to bottles developed for this purpose.

The patent literature indicates that alternative solutions have been proposed to allow the administration of enteral products directly from their original aseptic carton packaging, using specially adapted enteral feeding sets to connect to the spouts of these packages. These solutions can be seen in document CN1711116A.

Other solutions proposed in the patent literature that enable the administration of enteral products directly from their original aseptic packaging include adapters or external connectors equipped with an access point for enteral feeding sets, which can be screwed onto the existing spout of aseptic carton packaging or affixed to another part of this packaging. Examples of such devices are illustrated in patent documents WO2019193213A1, EP1352843A1, and CN1711116A.

Patent document WO2019193213A1, unlike an opening device, describes an adapter intended to attach to the spout present in an aseptic carton package. It provides multiple access points to which various devices can be connected for specific functions: mixer, applicator, and adapter. The latter is an adapter comprising a device equipped with an access point to connect enteral feeding sets and is designed to be screwed onto the spout of the packaging after its primary cap has been removed.

Patent document EP1352843A1 describes not an opening device but an external adapter, which is designed to be adhered to an aseptic carton package featuring a straw access point, similar to a package with a "Single Serving" (SASS) opening system. The method specifies that the opening in the adapter should be positioned concentrically with the opening in the carton aseptic package. The document outlines an external device consisting of two separate modules, which together provide a means for administering enteral products directly from their original packaging.

Patent document CN1711116A, unlike an opening device, describes a connector intended for connecting an enteral feeding set to an aseptic carton packaging system. According to CN1711116A, this packaging system comprises an aseptic carton package already equipped with an opening system that includes a spout. Among the methods presented in the document, the most relevant technique involves designs intended to be screwed onto the spout of an aseptic carton package (like Tetra Brik®). It's crucial to highlight that the description clearly demonstrates that this is an external device functioning as an additional accessory, not an integral or permanent part of the packaging. This aspect is evident since the device needs to be screwed onto the spout of the package to open it and access the product. The technique specified in CN1711116A requires the connector to be screwed onto the spout in a sealing direction, breaking the seal and accessing the contents. This action of screwing the connector onto the spout and thereby breaking the protective seal clearly demonstrates the external nature of the device. In contrast, automated opening devices on aseptic carton packages open the packaging when the cap is unscrewed from the spout, breaking a tamper-evident seal and cutting through the protective seal of the contents. This difference in opening techniques, besides highlighting the external nature of the connector, contradicts the principle of a closed enteral system because when the protective barrier provided by the seal is breached, the package contents are exposed to the environment. Therefore, the device described in CN1711116A is not an opening device already present in an aseptic carton package, and the associated technique does not meet the requirements necessary for administering its contents in a closed enteral system.

A comprehensive analysis of the devices suggested in the current state of the art reveals that: a) the opening devices currently used in multilayer aseptic packaging are not suitable for enteral administration, requiring additional external devices; b) the additional external devices used to administer enteral products directly from their aseptic carton packaging are external elements designed to fit the spouts present in the opening devices of such packaging. Furthermore, the techniques described for using these external devices share a vulnerability incompatible with closed enteral systems: the need to open the packaging before connecting the enteral feeding set. This process inevitably exposes the contents to the environment, compromising the product's sterility.

In the practice of enteral nutritional therapy, the use of aseptic carton packaging has been limited to open enteral systems, revealing a gap in current technology. This observation indicates the opportunity for a new concept of an opening device for aseptic carton packaging that retains similarities with existing opening devices but is equipped with a means of access for standard enteral feeding sets.

About Enteral Nutrition Administered Via a Closed System:

The closed system of enteral nutrition is an approach that eliminates the need for handling, transferring, or adding components to the formulas. This is because the enteral nutrition formula is already prepared, sealed, and sterilized in its packaging, which is designed to maintain sterility throughout the entire process, from manufacturing to administration to the patient.

In the closed enteral nutrition system, the product's packaging is meticulously designed to ensure that its contents do not come into contact with the external environment at any point until the product is fully administered to the patient. This system, which keeps the product completely protected until it is fully infused, is made possible by the caps of these packages, which are specially designed with devices for direct connection to the enteral feeding set. Some examples of these access devices are disclosed in patents WO2010030528 and US2018296438A1. In a closed system, access to the product occurs only when the enteral set penetrates the packaging, breaking the protective seal while simultaneously sealing the packaging with the set's own devices that fit snugly into the cap devices. This connection must occur in a manner that ensures the interior of the packaging is not exposed to the external environment, not even for a moment.

It is important to note that the current packaging developed for the closed system does not have opening mechanisms for transferring the content to other containers for use in an open system. Some specific packages for the closed system require additional connector devices that facilitate the extraction of the content for use in an open system.

In other packages of this type, if the use through an open system is chosen, it is possible to remove its screw cap, revealing an aluminum seal. This seal can then be cut or pierced using external tools, allowing access to the contents.

Current packaging for closed-system products can be categorized as non-collapsible (more rigid) or collapsible (more flexible).

Non-collapsible packaging is equipped with caps that incorporate both an access device for tubing and microbiological filters. These filters enable air from the environment to neutralize the internal pressure of the packaging, thus allowing the infusion of the contents by gravity flow. Examples of these air inlet devices can be found in caps designed for rigid packaging intended for closed-system products, as evidenced by patents WO2010030528A2, US2018296438A1, and commercial products with designs similar to the technical drawings USD427306S and USD330332S.

On the other hand, collapsible packaging eliminates the need for air intake provided by such filters. Due to their highly flexible nature, the structure of these packages does not exhibit resistance to the negative internal pressure generated during the infusion process, ensuring a uniform flow of the contents.

Regarding the types of access available in containers for administering enteral nutrition and their corresponding feeding sets:

In containers that store enteral nutrition products prior to administration, both disposable bottles used for portioning open-system products and the packaging for closed-system products commonly feature two types of set connections: a connection for Spike Enteral Feeding Sets (spike-shaped tip) and a connection for ENFit Enteral Feeding Sets (cross-shaped tip).

The spike enteral feeding set is characterized by the design of the device at its proximal end, which gradually tapers to resemble a thorn or spear. This device has a sharp tip that, when inserted into the designated access area, punctures the packaging of the enteral nutrition product.

The ENFit enteral feeding set represents a connection type with a more specific design, established as an international standard for enteral connections. This standard aims to enhance patient safety, prevent administration errors, and ensure compatibility among various medical devices. The ENFit connection also has a pointed tip to puncture the designated area of the packaging but is distinguished by its cross shape, which provides a more precise fit with the container holding the product. Additionally, a female thread surrounds this connection, preventing accidental disconnections and ensuring secure administration of enteral nutrition.

Such mechanisms, together with the enteral feeding tube and the container holding the enteral formula, form an enteral system. This system allows the contents of the packaging to flow through the tubing, which is formed by the connection between the feeding set and the enteral feeding tube, reaching the specific region of the digestive system where it will be processed and absorbed.

Regarding the Resolution of Challenges that Remain Unsolved in the Current Prior Art:

For enteral administration, products in aseptic cartons depend on one of two approaches present in the current prior art. The first approach relies on external devices, such as connectors and adapters, compatible with standard enteral feeding sets, as illustrated in patent documents CN1711116A, EP1352843A1, and WO2019193213A1. The second approach employs specialized feeding sets that replace the pointed ends of standard feeding sets with structures specifically designed for direct connection to the spouts of aseptic cartons, exemplified by prefabricated enteral administration systems, as shown in patent CN1711116A. In both cases, these are external devices that attach to the spouts provided by the opening devices of these packages, allowing administration via the enteral route. However, both approaches offer alternative auxiliary devices external to the packaging, with their methods of use revealing the challenges of administration in a closed enteral system.

It is widely recognized that enteral products manufactured in aseptic cartons are not provided with opening devices equipped with specific mechanisms for connecting standard enteral feeding sets.

It becomes clear that current practice does not provide an effective solution for administering enteral products in aseptic cartons that fully complies with the requirements of a closed enteral system.

The present invention overcomes the deficiencies observed in current technology by providing an innovative opening device in aseptic cartons. This device allows for the administration of enteral products manufactured in such cartons using standard enteral feeding sets. It stands out by eliminating the need for additional external devices and meeting the criteria established for closed enteral nutrition systems.

DESCRIPTION OF THE DRAWINGS

The invention can be embodied in various layouts with alternative mechanisms and complementary components. Below is the description of the figures provided to illustrate the invention and some of its concepts:

FIG. 2A presents the top view of the cap (2) of the opening device (T).

FIG. 2B presents the bottom view of the cap (2) of the opening device (T).

FIG. 2C presents the opening device (T), as described in FIGS. 2A-2D, disassembled, showing all its parts before assembly.

FIG. 2D illustrates the opening device (T), as described in FIGS. 2A-2D, fully assembled, with all parts properly fitted.

FIG. 3A presents the top view of the cap (2) of the opening device (T).

FIG. 3B presents the bottom view of the cap (2) of the opening device (T).

FIG. 3C presents the opening device (T), as described in FIGS. 3A-3D, disassembled, showing all its parts before assembly.

FIG. 3D illustrates the opening device (T), as described in FIGS. 3A-3D, fully assembled, with all parts properly fitted.

FIG. 4A presents the top view of the cap (2) of the opening device (T).

FIG. 4B presents the bottom view of the cap (2) of the opening device (T).

FIG. 4C presents the opening device (T), as described in FIGS. 4A-4D, disassembled, showing all its parts before assembly.

FIG. 4D illustrates the opening device (T), as described in FIGS. 4A-4D, fully assembled, with all parts properly fitted.

FIG. 5A presents the top view of the cap (2) of the opening device (T).

FIG. 5B presents the bottom view of the cap (2) of the opening device (T).

FIG. 5C presents the opening device (T), as described in FIGS. 5A-5D, disassembled, showing all its parts before assembly.

FIG. 5D illustrates the opening device (T), as described in FIGS. 5A-5D, fully assembled, with all parts properly fitted.

Figure 1:
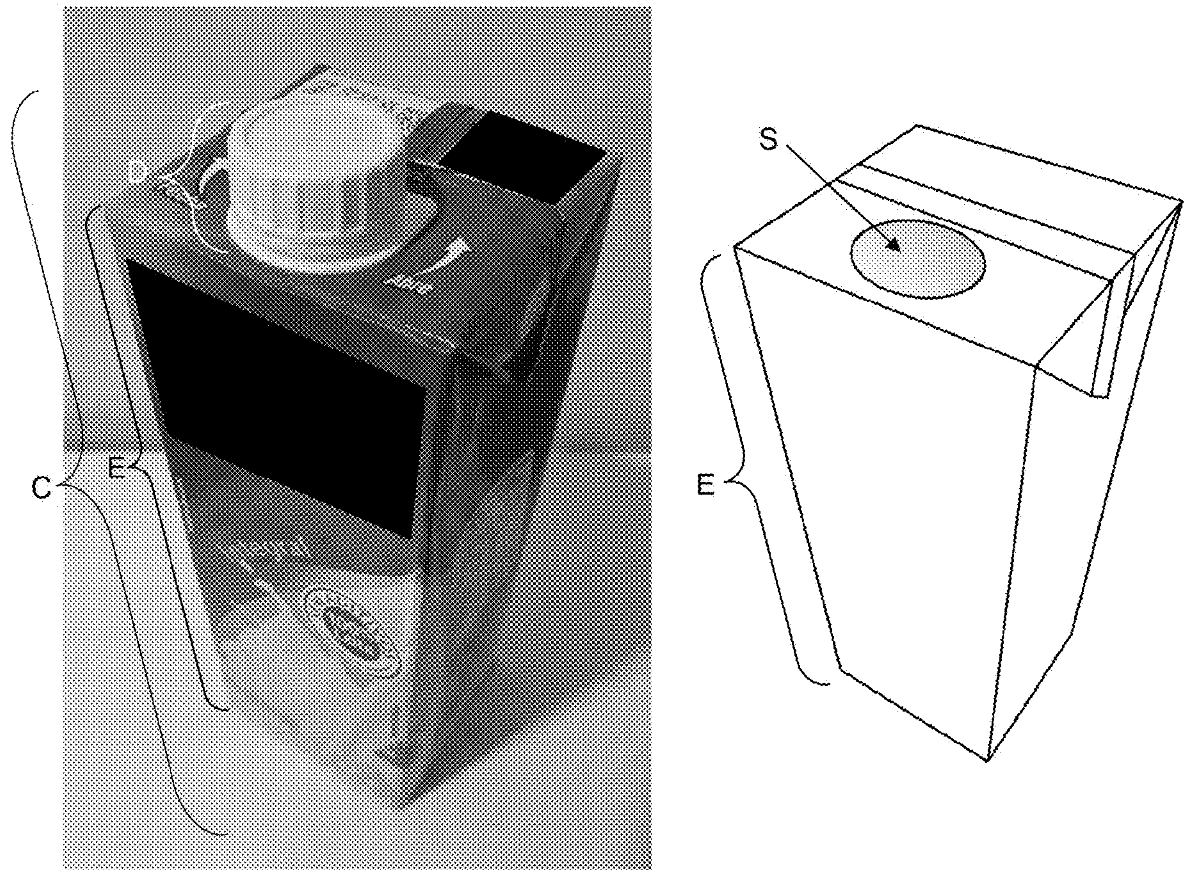
FIG. 1 presents a photograph of a traditional aseptic carton packaging (E) with an automated opening device (D), as currently used in enteral products intended for administration in an open system. The image on the right side is a graphic representation of the same packaging (E) before the opening device (D) is incorporated, highlighting the weakened area (S) formed by the removal of the upper layers of plastic and cardboard.
Figure 2A:
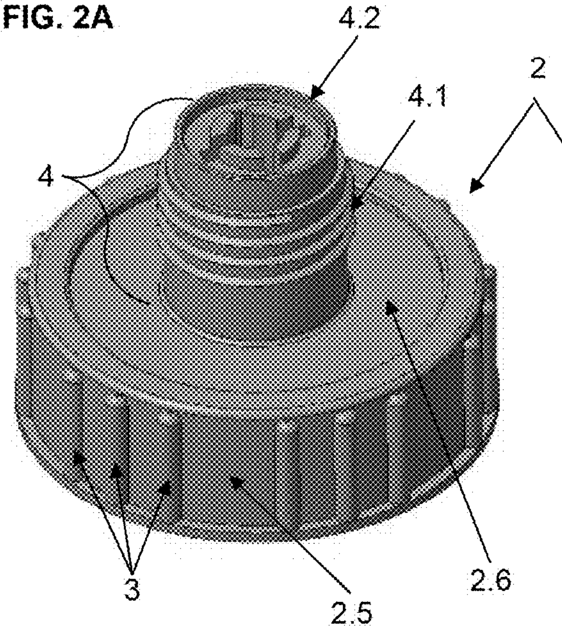
FIGS. 2A to 2D present an opening device (T) of an aseptic carton packaging (E) equipped with: an access device (4) for the connection of standard ENFit enteral feeding sets, and an automated opening mechanism (1.1; 2.3).
Figure 2B:
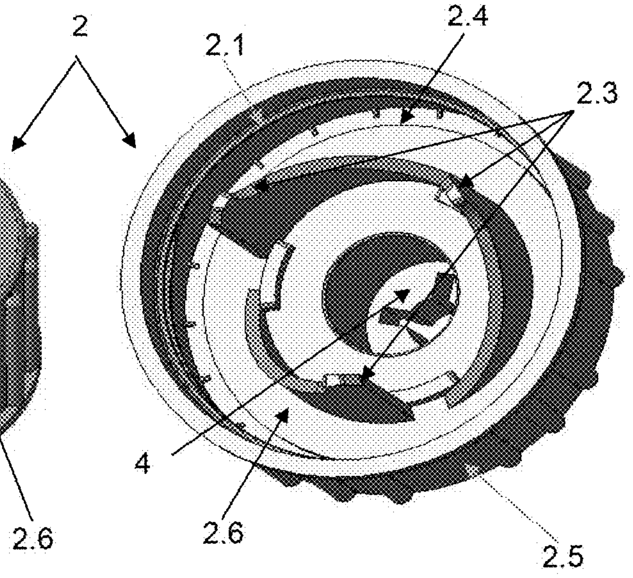
Figure 2C:
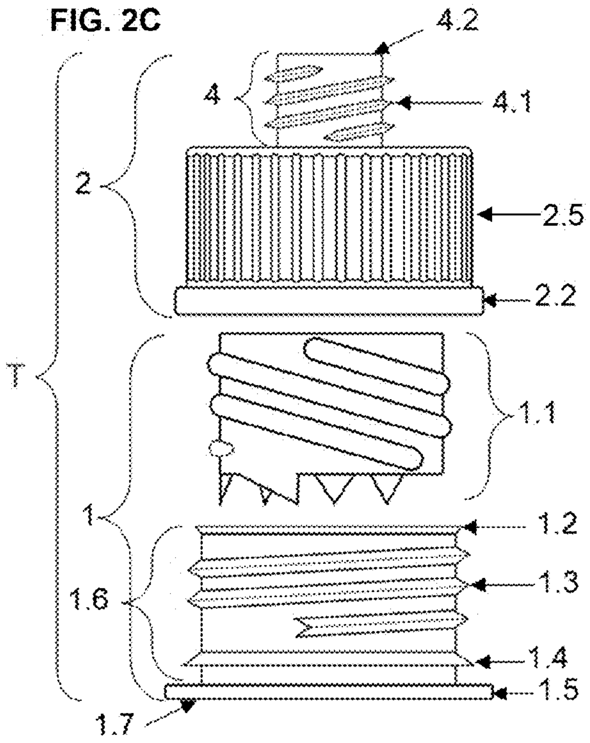
Figure 2D:
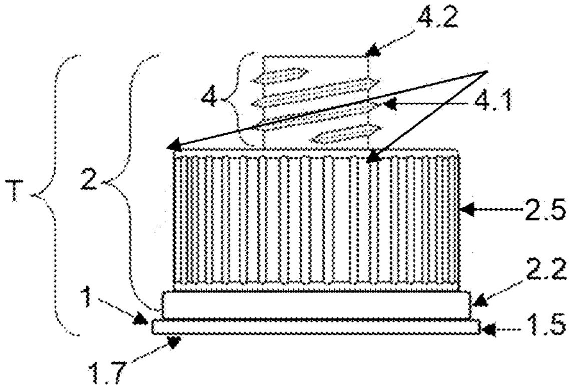
Figure 3A:
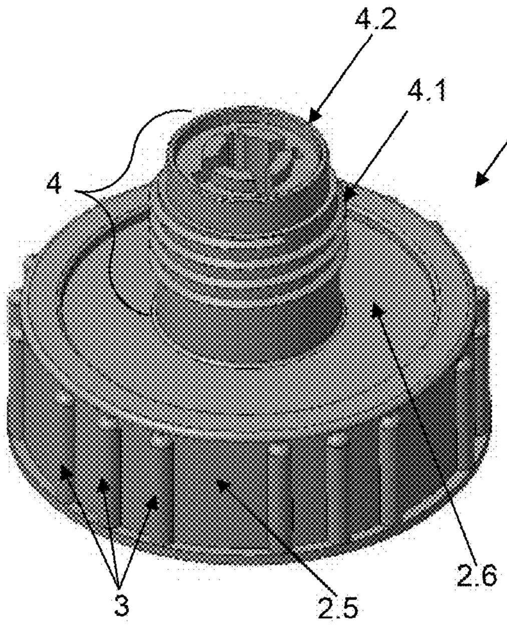
FIGS. 3A to 3D present an opening device (T) of an aseptic carton packaging (E), equipped with an access device (4) for the connection of standard ENFit enteral feeding sets. In the packaging (E) that adopt this model of device (T), the removal of the internal protective seal (S), for use in an open system, is performed manually.
Figure 3B:
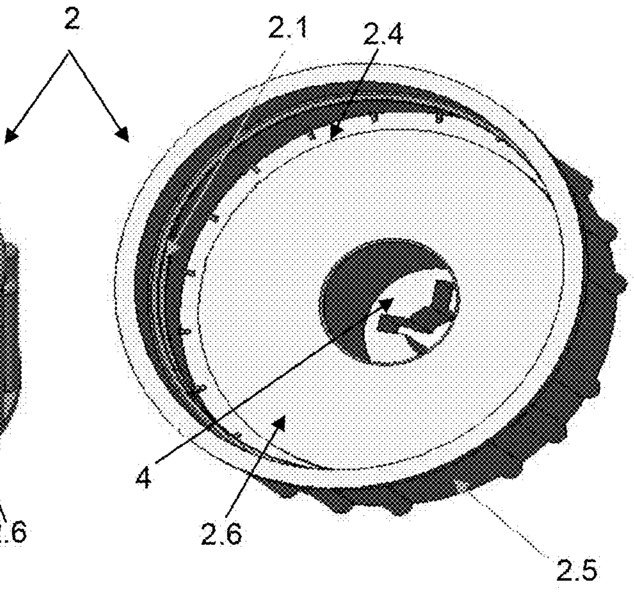
Figure 3C:
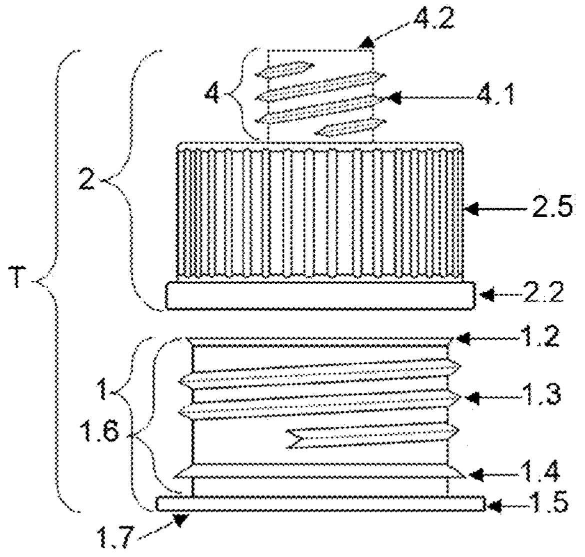
Figure 3D:
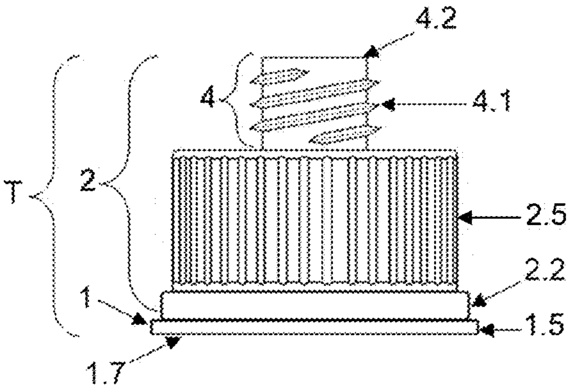
Figure 4A:
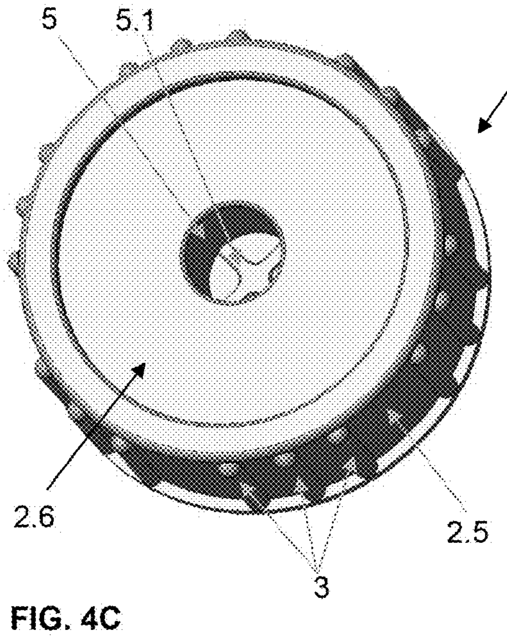
FIGS. 4A to 4D present an opening device (T) of an aseptic carton packaging (E) equipped with: an access device (5) for the connection of standard Spike enteral feeding sets; and an automated opening mechanism (1.1; 2.3).
Figure 4B:
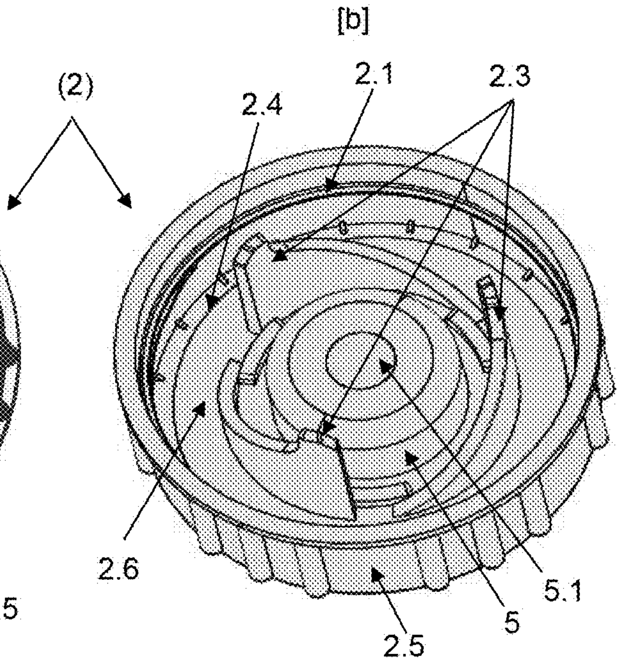
Figure 4C:
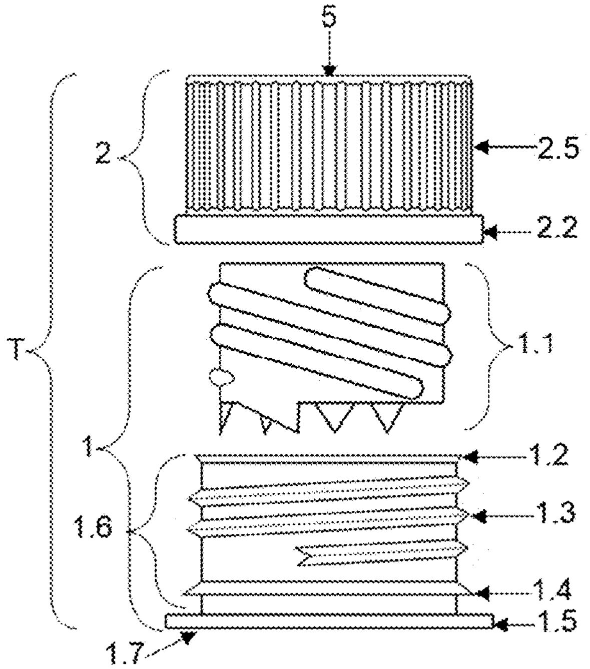
Figure 4D:
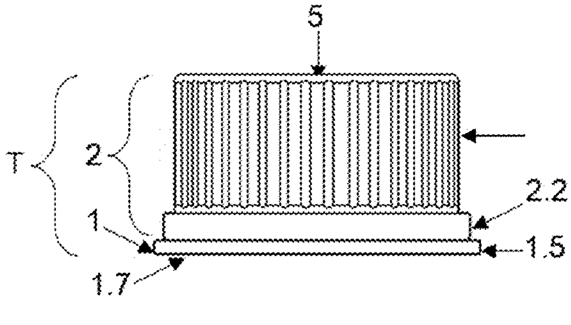
Figure 5A:
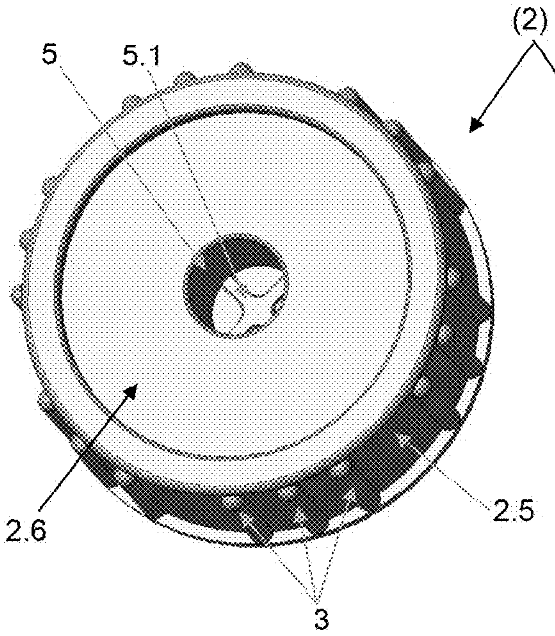
FIGS. 5A to 5D present an opening device (T) of an aseptic carton packaging (E) equipped with an access device (5) for the connection of standard Spike enteral feeding sets. In packages (E) adopting this model of device (T), the removal of the internal protective seal (S) for use in an open system is performed manually.
Figure 5B:
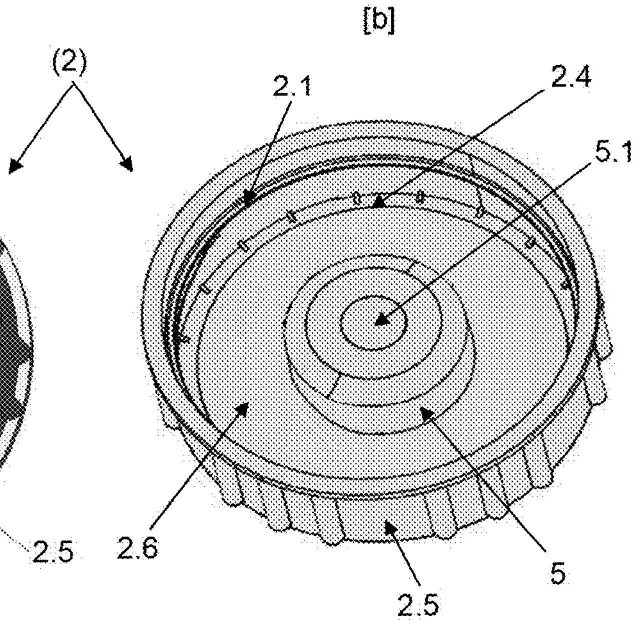
Figure 5C:
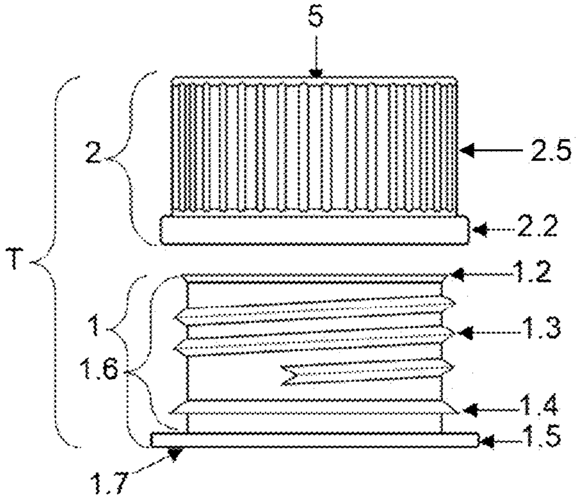
Figure 5D:
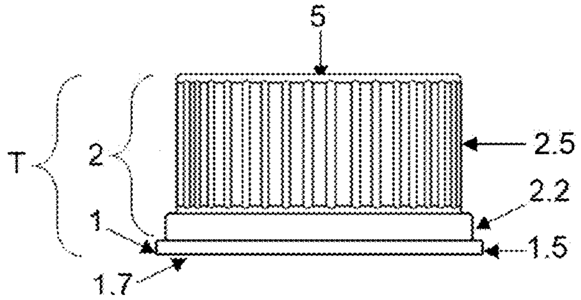

The most important components for understanding and applying the present invention are described below:

(E)—Aseptic carton packaging—not part of the invention, but its identification is important to facilitate the descriptions.

(S)—Protective seal present in an aseptic carton packaging (E), comprising a circular region formed by the removal of the upper layers of plastic and cardboard to create an area less resistant to cutting by element 1.1.

(D)—Automated opening device (DAA), widely recognized and used in aseptic carton packaging (E)—not part of the invention, but its identification is important to facilitate the descriptions.

(C)—Packaging system formed by an aseptic carton packaging (E) and an opening device (T; D; or TLAM).

(T)—This is the present invention, an opening device of an aseptic carton packaging (E) formed by a base (1) and a cap (2) provided with an access device (4; 5) for enteral feeding sets.

(1)—Base, the lower part of the opening device (T).

(1.1)—Cutting element positioned inside the spout (1.6) of the base (1).

(1.2)—Upper rim of the spout (1.6) of the base (1), designed to promote the hermetic sealing of the packaging (E) in synergy with the structure (2.4) of the cap (2).

(1.3)—Male thread surrounding the outer part of the spout (1.6) of the base (1) for securing the female thread (2.1) present on the inner part of the cylindrical body (2.5) that makes up the cap (2).

(1.4)—Structure provided at the lower part of the spout (1.6) of the base (1) for association with the tamper-evident seal (2.2) present on the cap (2) of the opening device (T).

(1.5)—Flat body comprising the lower element of the base (1), where the cylindrical body forming the spout (1.6) is provided orthogonally.

(1.6)—Cylindrical body comprising the upper element of the base (1), forming a spout with a male thread (1.3) corresponding to the female thread (2.1) provided inside the cap (2).

(1.7)—Region on the lower surface of the base (1) where the adhesive is applied to permanently fix the opening device (T) to the packaging (E).

(2)—Cap, the upper part of the opening device (T).

(2.1)—Female thread provided inside the cylindrical body (2.5) that makes up the cap (2) of the opening device (T), compatible with the male thread (1.3) surrounding the spout (1.6) of the base (1) of the same device (T).

(2.2)—Tamper-evident seal provided at the lower rim of the cap (2) of an opening device (T). When broken, it indicates that the packaging has been opened or tampered with and that the product is no longer eligible for administration in a closed system.

(2.3)—Structure formed by integrated elements orthogonally to the inner surface of the closing area (2.6) of the cylindrical body (2.5). Designed to promote a downward movement of the cutting element (1.1) of the base (1), simultaneously with the rotational movement of the cap (2) during the opening process of the packaging (E) through the opening device (T).

(2.4)—Circular structure provided on the inner face of the closing region (2.6) of the cap (2). Designed for continuous compression against the upper edge (1.2) of the spout (1.6), ensuring a hermetic seal both before and after breaking the seal (2.2) through precise threading.

(2.5)—Cylindrical body that makes up the cap (2) of an opening device (T).

(2.6)—Closing region provided at the upper rim of the cylindrical body (2.5) that makes up the cap (2) of an opening device (T).

(3)—Protrusions provided around the cylindrical body (2.5) that makes up the cap (2) for better finger grip during the opening of the device (T) when the product is intended for use in an open system.

(4)—Cylindrical body comprising the access device for connecting an ENFit set, provided in the closing region (2.6) of the cylindrical body (2.5) of the cap (2).

(4.1)—Male thread of the access device (4) corresponding to the female thread of an ENFit set.

(4.2)—Circular area located on the surface of the access device (4), where the compression of the sealing ring found in ENFit equipment occurs. This compression ensures that the coupling of the enteral set to the opening device (T) of a packaging (E) maintains a hermetic seal.

(5)—Cylindrical body comprising the access device for connecting a Spike set, provided in the closing region (2.6) of the cylindrical body (2.5) of the cap (2). The sealing structure of the Spike set is circumferentially compressed in the internal region of this device (5), ensuring a hermetic seal of the packaging.

(5.1)—Closing region at the lower edge of the access device (5), made with a thinner thickness, forming a weakened area to facilitate penetration by a Spike set.

(6)—Microbiological filter provided in the closing region (2.6) of the cylindrical body (2.5) of the cap (2), allowing air to enter to balance the internal pressure of the packaging (E).

DESCRIPTION OF THE INVENTION

For the purpose of interpreting the documents related to the patent application for this invention, the following definitions shall apply: where appropriate, terms used in the singular shall also include the plural and vice versa. In any situation of conflict between definitions set forth below and those present in other documents, including any documents potentially incorporated into the descriptive report, the definition here shall prevail for the purposes of interpreting the invention and attached claims, unless stated otherwise. Terms such as "a" or "an" associated with "comprising" or "including" in the claims and/or report may refer to a single item or multiple items. The term "or" in claims refers to "and/or" unless explicitly indicated otherwise. Words like "comprising," "having," "including," or "containing" are inclusive in nature and do not exclude other steps or elements not mentioned. Those skilled in the art will understand that, in some contexts, "comprising" may be substituted by "consisting essentially of" and/or "consisting of". The term "about" allows for a variation of up to 10% of the associated numerical value, unless another value is specified.

Regarding the description that follows, referring to an embodiment of the invention and to the attached drawings and possible examples, it serves to elucidate its principles. The embodiment details the invention sufficiently for those skilled in the art to reproduce it. Other embodiments are also possible, and structural, physical, and/or chemical changes may be made without deviating from the spirit and scope of the invention. Unless defined otherwise, all technical and scientific terms used in this report have meanings commonly understood by one skilled in the art.

Further to the description, the images or drawings attached do not represent a fixed specification and do not indicate any mode of industrial design registration for the invention. They are illustrative presentations, intended to facilitate the understanding of the concept of the invention. If, for example, an image of a mechanism from the prior art is used, it does not imply an exact representation of the mechanisms developed for the present invention, but rather a concrete example, widely recognized and used, to clarify the concept in question. It is important to emphasize that the prior art devices integrated into the present invention are those whose patent protection has already expired or are conceptually similar. However, the essence of the present invention can be harmonized with devices still under patent protection, provided that authorization is duly obtained from the holder of such rights.

For visualization purposes, terms such as "upper," "lower," "vertical," and "horizontal" refer to positions in the Figures as depicted. "Longitudinal" and "transverse" refer to the viewing sequence, from top to bottom and from left to right, respectively. The term "anterior" should be related to what is visible in the Figure, and the term "posterior" should be related to what is on the opposite side of the Figure.

About the Concept of the Invention:

The invention relates to an opening device (T) composed of two parts: the base (1) and the cap (2). It is emphasized that this invention incorporates opening mechanisms similar to those widely used in opening devices (D) of aseptic carton packaging (E). In some embodiments, the base (1) provides an opening mechanism similar to the devices (D) currently available on the market, including a "cutting element" (1.1) in the models with an automated opening mechanism (FIGS. 2A-2D and 4A-4D). FIGS. 2A-2D and 4A-4D show that the cap (2) has an "auxiliary structure" (2.3) designed to rotate the "cutting element" (1.1) positioned inside the spout (1.6) of the base (1), giving the device (T) an automatic opening functionality. This functionality optionally facilitates the use of the product in an open enteral system, simply by unscrewing the cap (2) to open the packaging (E).

This model of the opening device (T) is permanently affixed to an aseptic carton package (E) during the manufacturing process of a product (C). As shown in FIGS. 2A-2D to 5A-5D, the device (T) can be materialized in various forms, either to fit the different types of sets available in the market, to facilitate production, or to improve the handling experience through more practical, comfortable, and safe models. Layouts of the device (T) were illustrated in models compatible with two types of enteral sets: ENFit standard (FIGS. 2A-2D and 3A-3D); Spike standard (FIGS. 4A-4D and 5A-5D). The various layouts can be produced with or without a microbiological filter (6).

An enteral product packaged in an aseptic carton package (E) equipped with an opening device (T) offers the possibility of administration in both open and closed enteral systems. This flexibility stems from the design of the opening device (T), which, in addition to mechanisms (2.1; 2.3) to facilitate access to the content for use in open systems, also integrates specific features (4; 5; 6) for administration in closed enteral systems: access device for the enteral feeding set (4 and 5); and a microbiological filter (6) that allows the entry of filtered air to balance the internal pressure of the package (E). Until now, such features (4; 5; 6) were known only in: external devices to enable the enteral administration of a product directly from its aseptic carton package (E); bottles for the administration of enteral formulas; and packaging specially developed for products intended for administration through a closed enteral system. Opening devices (T) without a microbiological filter (6) can be integrated into packages (E); however, these packages need to be prepared to become easily collapsible, maintaining satisfactory product flow during administration.

The inventive concept is broadly illustrated as an opening device (T) for aseptic carton packaging (E) with access for enteral feeding sets (4 and 5) in its cap (2). The opening device (T) consists of a base (1) and a cap (2). The cap (2) may contain an auxiliary structure (2.3) to rotate the cutting element (1.1) inside the base (1) in some models of the invention, in addition to a fitting for enteral feeding sets (4 and 5). In these models, the base (1) can be connected to the cap (2) by fitting the tamper-evident seal (2.2) to the structure (1.4) of the base (1). For use as an open system, the tamper-evident seal (2.2) is broken by unscrewing the cap (2) from the opening device (T) to open the packaging, breaking the internal seal (S) and allowing the content to be transferred to another container for oral use or in an open enteral system. In models without an automatic opening mechanism, the tamper-evident seal (2.2) becomes dispensable. This is because such packages preserve the integrity of the internal seal (S) or the manual opening seal even after unscrewing and subsequently removing the cap (2) from the spout (1.6) that forms the base (1).

About the Construction of the Invention:

The opening device (T) consists of two essential parts: the base (1) and the cap (2). Models that incorporate an automatic opening mechanism also include a third component: the cutting element (1.1) located internally at the spout (1.6) of the base (1). The production of these components can occur through the plastic injection process. In this procedure, thermoplastic resins such as polypropylene and polyethylene are heated until they become liquid and are then injected into precise molds under controlled pressure. For configurations where the base (1) is formed during the aseptic filling, the plastic injection technology is directly integrated into the filling machine, often used in packages (E) that use caps with a manual opening seal (TLAM).

To achieve the desired robustness and specificity, some parts may be derived from the combination of subparts. The union of these subparts can employ a range of techniques: from precise and irreversible fittings under compression to various welding methods such as hot welding (thermofusion), ultrasonic welding, vibration welding, laser welding, or any other method commonly used in the plastic industry.

Just as in caps for non-collapsible packaging for closed system enteral products, some embodiments of this opening device (T) are equipped with a microbiological filter (6). This filter (6) is essential in non-collapsible packaging because it ensures the entry of properly filtered air into the packaging, maintaining pressure balance and ensuring continuous flow during the infusion of the enteral product into the patient. The integration of this filter (6) into the closing region (2.5) of the base (2) of the opening device (T) can be achieved through plastic welding, adhering the filter (6) directly to the base (2) in a stable manner. Alternatively, the filter (6) can be interspersed between plastic parts that, when fitted under pressure, join irreversibly, or by other plastic welding methods previously mentioned.

After the molding and assembly stages, the parts are combined to form the opening device (T). In the conventional approach, the opening device (T) is already prepared to be attached to the packaging (E). However, in the method where the base (1) is molded during the filling process, the production phases occur at different times and places: independent manufacturing of the cap (2) by plastic injection; molding of the base (1) by the injector integrated into the aseptic filler; and the joining of the cap (2) to the base (1) already formed in the packaging (E). Precise methods such as fittings or threading ensure the perfect attachment of the opening device (T). Additional protection, such as an adhesive film or a removable plastic component, can be added to protect the connection area of the enteral feeding sets (4 and 5), providing an extra layer against dirt. The result is a solid and effective device (T) that ensures a hermetic and secure closure of the packaging (E).

It is important to highlight that for packaging equipped with opening devices without a microbiological filter (6), a specific procedure is required to ensure the effectiveness of the infusion. The carton packaging must be prepared to become easily collapsible. This is necessary to prevent the emergence of negative pressure inside the packaging as the content is drained during the infusion process. To achieve this adaptability, the ends of the packaging must be carefully unfolded, deconstructing both the upper and lower vertices. By performing this step, all the edges of the packaging become malleable. This structural modification undoes the original parallelepiped formation of the packaging, allowing it to easily yield and collapse as the content flows, ensuring a continuous and uninterrupted infusion, even in the absence of compensatory air intake.

EXAMPLES OF EMBODIMENTS OF THE INVENTION

Figure 6:
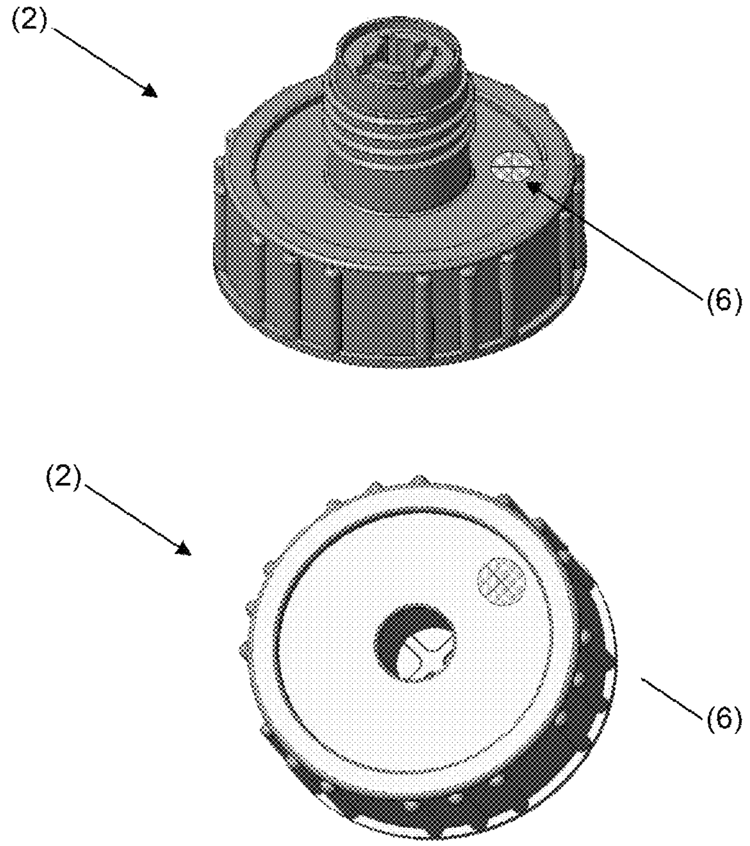
FIG. 6 presents drawings of the cap (2) belonging to the opening device (T) provided with a microbiological filter (6).

Some examples of implementations of the invention are depicted in FIGS. 2A-2D to 5A-5D. Any embodiment can be produced with a microbiological filter (6), as illustrated in FIG. 6. However, due to the simplicity of its manufacture and the more affordable cost associated with spike sets, FIGS. 4A-4D illustrate the preferred approach for implementing the invention.

Most aseptic carton packaging (E) used in liquid foods features an opening device (D); however, none of the existing opening device models (D) in the prior art for aseptic carton packaging (E) provide means to connect an enteral feeding set, as is the case with the opening device (T). Therefore, the present invention (T) represents an innovative solution for the market, enabling aseptic carton packaging to be used in products qualified for administration in closed enteral systems.

The invention claimed is:

1. An opening device configured for use with an aseptic carton packaging used for enteral nutrition, the opening device comprising:

a cap comprising a cylindrical body with a closure region and an upper edge that is joined to the closure region, a thread on an inner region of the cylindrical body, a sealing structure on an inner face of the closure region, a tamper-evident seal on a lower edge of the cap, a structure formed by elements integrated orthogonally to an internal surface of the closure region and configured to activate a cutting element;

a base that comprises a lower element and an upper element, in which:

the lower element of the base has a body that is substantially flat in an upper region thereof, and the body includes a lower region that is configured to receive an adhesive to adhere the opening device to the aseptic carton packaging;

the upper element of the base comprises a cylindrical body substantially orthogonal to the lower element;

the cylindrical body of the base is provided with an external thread configured to engage with the thread on the inner region of the cylindrical body of the cap to secure the cap to the base; and the cutting element is configured to be activated by the base during rotation of the cap;

and an access device formed in the closure region, the access device is configured to mate with an enteral feeding set.

2. An opening device configured for use with an aseptic carton packaging used for enteral nutrition, the opening device comprising:

a cap that comprises a cylindrical body with an upper edge that is joined to a closure region of the cap, a thread on an inner region of the cylindrical body, a sealing structure on an inner face of the closure region of the said cylindrical body;

a base that comprises a lower element and an upper element, in which:

the lower element of the base comprises a body that is substantially flat in an upper region thereof, and the body includes a lower region that is configured to receive an adhesive to adhere the opening device to the aseptic carton packaging;

the upper element of the base comprises a cylindrical body substantially orthogonal to the lower element; and the cylindrical body of the base is provided with an external thread configured to engage with the thread on the inner region of the cylindrical body of the cap to secure the cap to the base; and an access device formed in the closure region, the access device is configured to mate with an enteral feeding set.

3. The opening device according to claim 1, further comprising a biological filter provided in the closure region of the cap.

4. The opening device according to claim 2, further comprising a biological filter provided in the closure region of the cap.

5. The opening device according to claim 1, wherein the access device comprises an opening in the closure region, and the opening is configured so that at least a portion of the enteral feeding set can extend through the opening.

6. The opening device according to claim 2, wherein the access device comprises an opening in the closure region, and the opening is configured so that at least a portion of the enteral feeding set can extend through the opening.

7. The opening device according to claim 1, wherein the access device further comprises a weakened area to facilitate penetration by the enteral feeding set.

8. The opening device according to claim 2, wherein the access device further comprises a weakened area to facilitate penetration by the enteral feeding set.

9. An aseptic carton package equipped with the opening device of claim 1.

10. An aseptic carton package equipped with the opening device of claim 2.

* * * * *